Aug. 23, 1932. W. I. JONES 1,873,893
SELF LOCKING SNAP FASTENER STUD
Filed Feb. 15, 1932
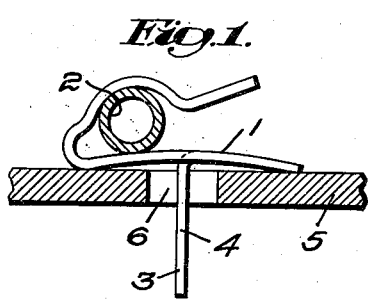
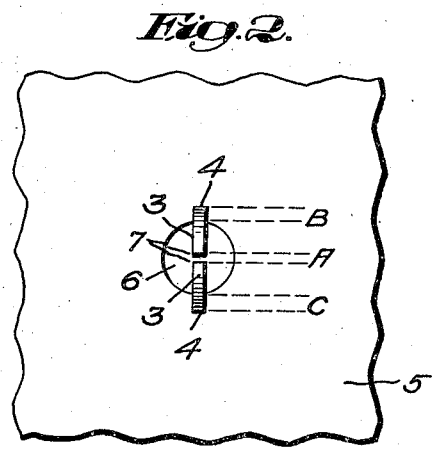
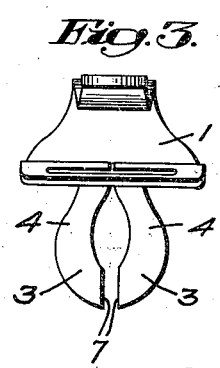
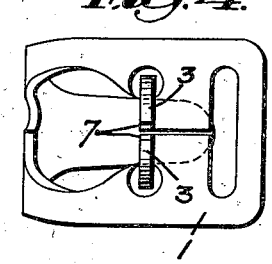
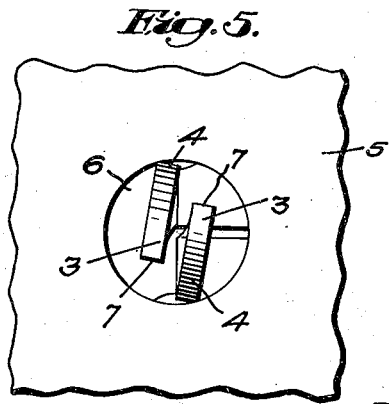
Inventor:
Walter I. Jones,
by Emery, Booth, Varney & Townsend
Attys Patented Aug. 23, 1932

1,873,893

UNITED STATES PATENT OFFICE

WALTER I. JONES, OF ARLINGTON, MASSACHUSETTS, ASSIGNOR TO UNITED-CARR FASTENER CORPORATION, OF CAMBRIDGE, MASSACHUSETTS, A CORPORATION OF MASSACHUSETTS

SELF-LOCKING SNAP FASTENER STUD

Application filed February 15, 1932. Serial No. 592,899.

My invention aims to provide improvements in simple snap fastener studs adapted to be automatically locked in attached positions.

In the drawing which illustrates a preferred embodiment of my invention:—

Figure 1 is an enlarged section through an installation showing one form of device embodying my invention;

Fig. 2 is a plan view of a portion of a structure to which my improved fastener is applied and showing the shank of the stud locked in position against axial withdrawal;

Fig. 3 is an end view of the fastener shown in Figure 1;

Fig. 4 is an under side plan view of the fastener shown in Fig. 3; and

Fig. 5 is an enlarged view of the structure shown in Fig. 2, but showing the relation of the portions of the shank of the fastener during the operation of attaching the fastener to the supporting structure.

My invention relates particularly to the idea of providing simple locking means as an integral part of a fastener stud whereby fasteners may be constructed for use with structures of various thicknesses and which will lock the fastener in place against accidental removal.

While the illustrated device is of a specific type, it should be understood that the invention is equally useful with any type of fastener device having two yieldable arms adapted to make snap fastening engagement with a socket or other suitable structure. Fasteners adapted for use with my invention are now well known in the art. My invention provides a simple and efficient locking means whereby the movable arms, forming the shank of a stud, are locked in engagement with the socket or other suitable structure especially against axial disengagement. The locking means is so constructed that the fastener may be easily and quickly engaged with the socket or other structure by a simple twisting action which, during the attaching operation, moves the arms apart in a transverse direction, as best illustrated in Fig. 5.

Referring now to the device illustrated, I have shown a conduit or like holding member which is made from a single piece of sheet metal bent to provide a base 1 which is more or less hook-shaped to permit insertion of a conduit 2 which may be a pipe, wire or the like. The fastening means is so constructed that a pair of yieldable fingers or arms 3—3 are formed from the blank and extend from the base 1 as illustrated. These fingers 3—3 comprise a stud shank and are arranged, preferably, in such a manner that one is opposite to the other so that they may abut when moved toward each other a predetermined distance. The outer edges 4—4 are shaped to converge relative to each other from the base 1 and then diverge toward each other at their free ends, thereby providing means for guiding and holding the shank in engagement with a structure such as the part 5 shown in Figs. 1 and 2. The arms 3—3 pass through the aperture 6 in the part 5 and engage the wall surrounding the aperture as illustrated. Since the edges 4—4 diverge for a substantial distance (Fig. 3), the shank is adapted to engage parts of different thicknesses.

I have found it desirable to lock certain types of fasteners against removal by direct axial movement and in the structure illustrated by the locking means (Figs. 2 and 3) comprises an abutment 7 formed on each of the arms 3—3 adjacent to its free end. Thus when the arms 3—3 are brought together sufficiently to contact the portions 7—7 further movement of the arms is prevented. Since the space between the portions 7—7 is as shown at A in Fig. 2, and the combined distance of B and C is much greater, the arms cannot contract sufficiently to permit them to be removed from the installation by direct axial pull.

In order that the fastener may be attached to the part 5, the arms 3—3 are adapted to move away from each other when the arms are inserted into the aperture 6 and the fastener is given a twist at the same time that pressure is applied. During the inserting action the edges 4—4 of the arms engage and bite into the wall surrounding the aperture 6 (Fig. 5) so that as the fastener is twisted the arms will move away from each other out of a common plane, thereby moving the abutments 7—7 out of alignment and permitting a scissors-like action of the arms as they are pressed into the aperture. After the fastener is inserted the arms 3—3 assume the positions shown in Fig. 2.

It is believed that those skilled in the art will understand that the locking feature of applicant's invention is particularly desirable and that it is adapted to fasteners for other uses. It will also be understood that the fastener may be removed by a pulling and twisting action.

While I have illustrated and described a preferred embodiment of my invention, I do not wish to be limited thereby, because the scope of my invention is best defined by the following claims.

Claims:

1. A fastener stud member having a base portion, a shank extending from said base comprising a pair of opposed yieldable arms having outer edges shaped to make snap fastening engagement with a cooperating stud-receiving means to hold the fastener in place, said arms having inner edges in the same vertical plane and having portions adapted to engage upon limited movement of the arms toward each other thereby preventing disengagement or engagement of the fastener by direct axial movement relative to the stud-receiving means but being adapted to be moved out of engaging relation by twisting movement of said fastener when being pressed into engagement with the stud-receiving means.

2. A sheet metal fastener of the snap fastener type having a shank comprising two spring arms formed from a sheet metal blank, a base from which said arms extend at substantially a right angle, said arms having their outer edges shaped to converge and then diverge to provide means for snap fastening engagement with suitable socket means, locking means provided on said arms and adapted to cooperate to prevent removal of the shank from the socket means by direct axial movement, and said arms being flat and in the same plane edgewise thereby to provide for said locking means acting when said arms are placed under strain by axial movement of the fastener.

3. A sheet metal fastener of the snap fastener type having a shank comprising two spring arms formed from a sheet metal blank, a base from which said arms extend at substantially a right angle and in the same general plane, said arms having their outer edges shaped to converge and then diverge to provide means for snap fastening engagement with suitable socket means, and each of said arms having an abutment portion at its free end to provide cooperating stops adapted to abut and prevent removal of the stud from the socket means by direct axial movement.

A sheet metal fastener of the snap fastener type having a shank comprising two spring arms formed from a sheet metal plank and located in the same general plane, a base from which said arms extend at substantially a right angle, said base being split to permit movement of the arms relative to each other, said arms having their outer edges shaped to converge and then diverge to provide means for snap fastening engagement with suitable socket means, and each of said arms having a portion of its free end adapted to abut and provide cooperating stops to prevent removal of the stud from the socket means by direct axial movement, and said arms being adapted to move out of the plane of each other to permit the stop portions to pass each other during attachment of the fastener to the socket means.

In testimony whereof, I have signed my name to this specification.

WALTER I. JONES.